J. W. TAYLOR.
BROILER.
APPLICATION FILED MAR. 7, 1911.
1,010,981.
Patented Dec. 5, 1911.
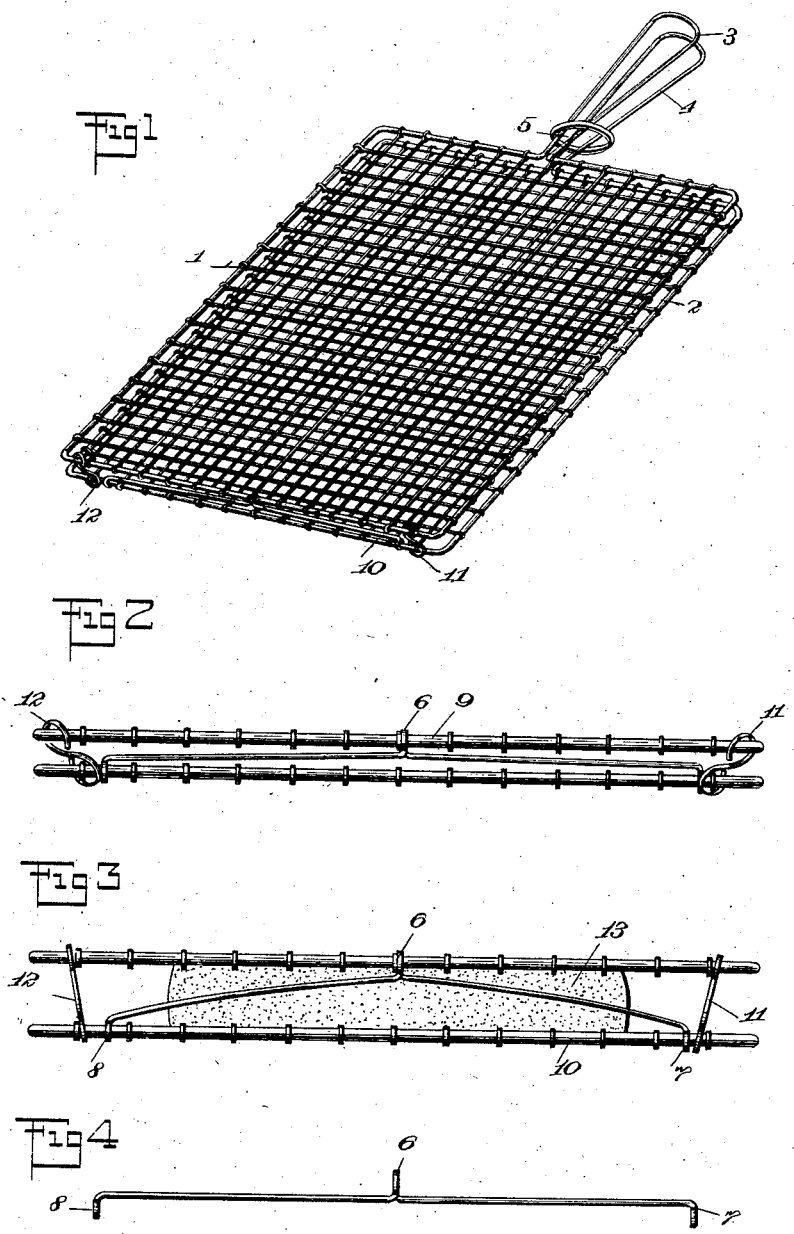
WITNESSES
C. J. Hachenberg.
L. J. Gallagher
INVENTOR
James W. Taylor.
BY Munn & Co.
ATTORNEYS

UNITED STATES PATENT OFFICE.

JAMES W. TAYLOR, OF ANTIGONISHE, NOVA SCOTIA, CANADA.

BROILER.

1,010,981.   Specification of Letters Patent.   Patented Dec. 5, 1911.

Application filed March 7, 1911. Serial No. 612,882.

*To all whom it may concern:*

Be it known that I, JAMES W. TAYLOR, a subject of the King of Great Britain, and a resident of Antigonishe, Nova Scotia, Dominion of Canada, have invented a new and Improved Broiler, of which the following is a full, clear, and exact description.

My invention relates generally to broilers and more particularly it relates to those articles of this class which comprise a pair of extended body portions suitably hinged together and between which articles of food are held over the fire in order to be cooked.

The object of the invention is to provide a broiler with a simple attachment at one end thereof and in engagement with each of the said body portions, the said attachment being in the nature of a spring whereby when certain substances are placed in the broiler and the body portions brought together, the substance will be firmly held in position and will not fall out when the broiler is turned.

Reference is to be had to the accompanying drawings forming a part of this specification, in which like characters of reference denote corresponding parts in all the views, and in which—

Figure 1 is a perspective view of my improved broiler; Fig. 2 is an end view thereof showing the device empty with the spring in position; Fig. 3 is an end view showing a substance held in the broiler, the spring being flexed out of normal position; Fig. 4 is a side view of the spring in normal position.

The broiler to which I have shown my device attached is made up of the extended body portions 1 and 2, loosely hinged at one end by means of wire rings 11 and 12, made of wire, each provided with a handle portion 3, 4, the substance to be cooked being placed between the parts 1 and 2, these parts being held in position by means of the ring 5 in engagement with the handles 3, 4.

The attachment is preferably made of a single length of wire bent at a central portion to provide a ring 6, each end portion being also offset and bent to form rings 7 and 8, the normal position of the wire between the rings, and extending transversely of the body portions 1 and 2, being substantially horizontal, as shown in Fig. 4.

Referring particularly to Figs. 2 and 3 which show the attachment in position, it will be noted that the ring 6 is in engagement with the end member 9 of the extended member 1 at about a central portion thereof, and the rings 7 and 8 are in engagement with the end member 10 of the extended member 2 at points adjacent the ends of this member.

When the attachment is placed in position on the broiler, the tendency of the members 1 and 2 is to lie closely together, due to the resiliency of the attachment; when any substance, such as a piece of meat 13, is placed between the body portions 1 and 2 the attachment is forced out of its normal position, thereby bringing pressure to bear between the ends of these parts 1 and 2.

In the use of a broiler equipped with my attachment there is no danger of the substance being cooked falling out of the broiler and into the fire due to the loose connection of the parts because the parts of the broiler are firmly held together by the attachment which always tends to return to its normal position, as shown in Fig. 4.

While I have shown my attachment as of a single form, it will be obvious that the invention may be comprehended in several different modifications, the purpose of which is to bring the end portions of the broiler closely together, thereby preventing any substance therein from falling out.

Having thus described my invention, I claim as new, and desire to secure by Letters Patent:

1. In a device of the class described two body portions loosely hinged together at one end thereof, together with a resilient member extending transversely of the body members and in engagement with each of them whereby the said body members are drawn together.

2. In a device of the class described, the combination of two body portions loosely hinged together at one end, together with a resilient member engaging each of the said body portions at the hinged end, the said resilient member tending to draw the body portions together when the broiler is empty and serving to maintain any article of food therein when the broiler is in use.

3. A device of the class described comprising a body member, another body member, a loosely hinged connection engaging adjacent ends of each of the body portions, an attachment having means at each end for engaging the end portion of one of the body members and being provided with an intermediate means for engagement with the end portion of the other body member, the said engagement being adjacent the loosely hinged ends of these members, the said attachment being resilient and tending to bring the said body members closely together.

4. A broiler comprising two body portions adapted to contain a suitable substance between them, the body portions being loosely hinged together at one end, together with a spring having a ring at each end thereof in engagement with one of the body portions, and an intermediate ring engaging the end of the other body portion whereby the said body portions are drawn together and the substance contained therein is prevented from falling out.

In testimony whereof I have signed my name to this specification in the presence of two subscribing witnesses.

JAMES W. TAYLOR.

Witnesses:
CHAS. J. MACGILLIVRAY,
D. J. MAXWELL.

Copies of this patent may be obtained for five cents each, by addressing the "Commissioner of Patents, Washington, D. C."